United States Patent
Pandita et al.

(10) Patent No.: US 11,932,245 B2
(45) Date of Patent: Mar. 19, 2024

(54) SYSTEMS AND METHODS FOR IMPROVING PATH SELECTION FOR AUTOMATED DRIVING

(71) Applicant: Toyota Motor Engineering & Manufacturing North America, Inc., Plano, TX (US)

(72) Inventors: Rohit Pandita, Ann Arbor, MI (US); Ruiko Miyano, Toyota (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 250 days.

(21) Appl. No.: 17/008,974

(22) Filed: Sep. 1, 2020

(65) Prior Publication Data
US 2022/0063612 A1 Mar. 3, 2022

(51) Int. Cl.
*B60W 30/12* (2020.01)
*B60W 60/00* (2020.01)
(Continued)

(52) U.S. Cl.
CPC ........ *B60W 30/12* (2013.01); *B60W 60/0027* (2020.02); *G01C 21/3407* (2013.01);
(Continued)

(58) Field of Classification Search
CPC ........... B60W 30/12; B60W 30/18154; B60W 60/0027; B60W 2552/53; B60W 2555/00;
(Continued)

(56) References Cited

U.S. PATENT DOCUMENTS 8,594,919 B2  11/2013  Munakata
9,815,462 B2  11/2017  Pandita et al.
(Continued)

OTHER PUBLICATIONS

J. Wu, H. Xu and J. Zhao, "Automatic Lane Identification Using the Roadside LiDAR Sensors," in IEEE Intelligent Transportation Systems Magazine, vol. 12, No. 1, pp. 25-34, Oct. 28, 2018, doi: 10.1109/MITS.2018.2876559. < https://ieeexplore.ieee.org/abstract/document/8513879> (Year: 2018).*
(Continued)

*Primary Examiner* — Tyler D Paige
*Assistant Examiner* — Karen Lynelle Furgason
(74) *Attorney, Agent, or Firm* — Christopher G. Darrow; Darrow Mustafa PC

(57) ABSTRACT

Systems, methods, and other embodiments described herein relate to improving identification of a path for an ego vehicle on a roadway. In one embodiment, a method includes, in response to acquiring sensor data from at least one sensor of the ego vehicle about a surrounding environment, identifying roadway elements from the sensor data as cues about the path. The roadway elements include one or more of lane markers of the roadway and surrounding vehicles. The method includes grouping the roadway elements into two or more groups according to characteristics of roadway elements indicating common curvatures. The method includes analyzing the two or more groups according to a confidence heuristic to determine a priority group from the two or more groups that corresponds with a trajectory of the ego vehicle. The method includes providing an identifier for the priority group to facilitate at least path planning for the ego vehicle.

20 Claims, 6 Drawing Sheets

| Roadway Element | Confidence Values |
|---|---|
| 4 lines are parallel | 1.0 |
| 3 lines are parallel | 1.0 |
| 2 ego-lines are parallel | 1.5 |
| Ego-lane surrounding vehicle | 0.6 |
| Other surrounding vehicle | 0.4 |
| Single solid line | 0.3 |
| Single dash line | 2.0: Ego/ 0.4: Other |

(51) Int. Cl.
  *G01C 21/00*   (2006.01)
  *G01C 21/34*   (2006.01)
  *G06V 20/56*   (2022.01)
  *H04Q 9/00*    (2006.01)
(52) U.S. Cl.
  CPC ....... *G01C 21/3815* (2020.08); *G06V 20/588* (2022.01); *H04Q 9/00* (2013.01); *B60W 2552/53* (2020.02); *B60W 2555/00* (2020.02)
(58) Field of Classification Search
  CPC ............ G01C 21/3815; G01C 21/3407; G06T 2207/30256; G06V 20/588; B06Y 2300/12
  See application file for complete search history.

(56) References Cited

U.S. PATENT DOCUMENTS

| | | | |
|---|---|---|---|
| 10,030,978 | B2 | 7/2018 | Vladimerou |
| 10,406,981 | B2* | 9/2019 | Chundrlik, Jr. ......... G01S 19/39 |
| 10,823,562 | B1* | 11/2020 | Carnahan ................... G06T 7/70 |
| 2008/0240506 | A1* | 10/2008 | Nakamura ............. G01C 11/00 |
| | | | 382/104 |
| 2010/0121569 | A1* | 5/2010 | Nakamura ......... G01C 21/3658 |
| | | | 340/995.14 |
| 2014/0347484 | A1* | 11/2014 | Byun ..................... G06V 20/58 |
| | | | 348/148 |
| 2015/0310283 | A1* | 10/2015 | Mori ..................... B60W 30/12 |
| | | | 382/104 |
| 2019/0095723 | A1* | 3/2019 | Tsuchiya .................. G08G 1/16 |
| 2019/0180115 | A1* | 6/2019 | Zou .......................... G06N 3/08 |
| 2020/0324787 | A1* | 10/2020 | Wang ..................... B60W 40/02 |
| 2021/0070300 | A1* | 3/2021 | Sun ................. B60W 30/18159 |
| 2021/0365694 | A1* | 11/2021 | Lee ....................... B60W 30/12 |

OTHER PUBLICATIONS

Li et al., "A Sensor-Fusion Drivable-Region and Lane-Detection System for Autonomous Vehicle Navigation in Challenging Road Scenarios," IEEE, 2013, found at https://www.researchgate.net/profile/Andreas_Nuchter/publication/260522418_A_Sensor-Fusion_Drivable-Region_and_Lane-Detection_System_for_Autonomous_Vehicle_Navigation_in_Challenging_Road_Scenarios/links/5890ba0b92851cda25689d4c/A-Sensor-Fusion-Drivable-Region-and-Lane-Detection-System-for-Autonomous-htttps://ieeexplore.ieee.org/stamps/stamp.jsp?tp=&arnumber=6594920.

* cited by examiner

SYSTEMS AND METHODS FOR IMPROVING PATH SELECTION FOR AUTOMATED DRIVING

TECHNICAL FIELD

The subject matter described herein relates, in general, to improving path selection for a vehicle, and, more particularly, to identifying roadway elements that provide cues for improving the determination of a vehicle path.

BACKGROUND

Various entities, such as vehicles, may be equipped with sensors that facilitate perceiving vehicles, obstacles, pedestrians, and additional aspects of a surrounding environment. The sensor data can be useful in various circumstances for improving perceptions of the surrounding environment so that systems, such as autonomous driving systems, can perceive the noted aspects and accurately plan and navigate accordingly. In general, the further the vehicle develops awareness about a surrounding environment, the better a driver can be supplemented with information to assist in driving and/or the better an autonomous system can control the vehicle to avoid hazards. However, because the sensors of the vehicle acquire the sensor data through a limited perspective (e.g., at road-level over a single observation of the environment) and for a constrained time period, the ability to develop a comprehensive assessment of aspects relating to navigable paths along a roadway may be difficult.

The difficulties can relate to aspects of the roadway that are generally difficult to perceive (e.g., small/occluded), dynamic aspects, features obscured by weather (e.g., snow, rain, etc.), and so on. For example, the lane markers of a roadway may become faint/worn over time. Thus, while a driver may be able to distinguish between different lanes, the sensors may not be able to easily perceive such subtle distinctions, especially in the presence of snow or other complicating circumstances. Additionally, a short time to acquire the sensor data, as well as limited computational time to process the data, can further constrain an observation and knowledge extrapolated therefrom. In any case, an entity navigating the roadway may encounter difficulties when perceiving aspects of the surrounding environment because of the noted issues and, as a result, may not develop a comprehensive contextual awareness of the environment in order to accurately follow a particular lane or path.

SUMMARY

In one embodiment, example systems and methods relate to a manner of improving path selection for a vehicle by identifying roadway elements that provide cues for improving the determination of a vehicle path. As previously noted, observations of a roadway may be inadequate for developing sufficient awareness about various aspects that identify paths for a vehicle to follow (e.g., lanes). For example, because a lane marker may be worn/missing or because a marker may be occluded by a vehicle ahead of an ego vehicle, the ego vehicle may not be able to adequately distinguish a path.

Therefore, in one embodiment, a tracking system uses observations about multiple different aspects of the environment as cues to facilitate the identification of a path and improve path planning. In one approach, the tracking system initially acquires sensor data about the surrounding environment from which the system may identify lanes of a roadway, trajectories of surrounding vehicles, and so on. In general, the tracking system identifies aspects of the surrounding environment that facilitate identifying navigable paths. The tracking system then characterizes the separate identified aspects according to, for example, curvature and/or other characteristics. For example, a surrounding vehicle having a trajectory that curves away is likely not following a lane that continues along a road but is instead following an exit lane. Similarly, a lane maker that curves away or has a general trajectory away from the roadway also is likely associated with an exit lane as opposed to a longitudinal travel lane of the roadway.

Accordingly, the tracking system uses the characteristics to group the different roadway elements using, for example, clustering. The separate groups define roadway elements having similar characteristics that are likely associated with a similar direction of travel. The tracking system can then analyze the separate groups using, in one or more arrangements, a table of weights that associate separate roadway elements with confidence/trust values that the roadway elements indicate a path. The table may define, for example, weights for separate sets of lane markers, weights for vehicles in a same lane as the ego vehicle, weights for vehicles in different lanes, and so on. In any case, the tracking system uses the table of weights according to a confidence heuristic to determine separate confidence values for the roadway elements and calculate priority metrics for the separate groups.

The priority metrics characterize each group and an overall correspondence with the ego vehicle. Thus, the tracking system can, for example, compare the metrics for the separate groups to determine which group has a desired priority. That is, the tracking system determines which group has a general character that corresponds with a path of the ego vehicle. In any case, the tracking system can then use the identified group as part of a path planning routine to provide cues about a path that the ego vehicle should follow. In a further aspect, the tracking system may use the identified group and/or other identified aspects (e.g., lane markers) as a point of comparison against a lane map to perform change detection. In this way, the tracking system improves operation of the ego vehicle by using available environmental cues to better inform the ego vehicle about how to proceed through an environment.

In one embodiment, a tracking system for improving identification of a path for an ego vehicle on a roadway is disclosed. The tracking system includes one or more processors and a memory communicably coupled to the one or more processors. The memory stores a sensor module, including instructions that when executed by the one or more processors cause the one or more processors to, in response to acquiring sensor data from at least one sensor of the vehicle about a surrounding environment, identify roadway elements from the sensor data as cues about the path. The roadway elements include one or more of lane markers of the roadway and surrounding vehicles. The memory stores a target module including instructions that, when executed by the one or more processors, cause the one or more processors to group the roadway elements into two or more groups according to characteristics of roadway elements indicating common curvatures. The target module includes instructions to analyze the two or more groups according to a confidence heuristic to determine a priority group from the two or more groups that corresponds with a trajectory of the ego vehicle. The target module includes instructions to provide an identifier for the priority group to facilitate at least path planning for the ego vehicle.

In one embodiment, a non-transitory computer-readable medium for improving identification of a path for an ego vehicle on a roadway and including instructions that, when executed by one or more processors, cause the one or more processors to perform one or more functions is disclosed. The instructions include instructions to, in response to acquiring sensor data from at least one sensor of the vehicle about a surrounding environment, identify roadway elements from the sensor data as cues about the path. The roadway elements include one or more of lane markers of the roadway and surrounding vehicles. The instructions include instructions to group the roadway elements into two or more groups according to characteristics of roadway elements indicating common curvatures. The instructions include instructions to analyze the two or more groups according to a confidence heuristic to determine a priority group from the two or more groups that corresponds with a trajectory of the ego vehicle. The instructions include instructions to provide an identifier for the priority group to facilitate at least path planning for the ego vehicle.

In one embodiment, a method for improving identification of a path for an ego vehicle on a roadway is disclosed. In one embodiment, the method includes, in response to acquiring sensor data from at least one sensor of the vehicle about a surrounding environment, identifying roadway elements from the sensor data as cues about the path. The roadway elements include one or more of lane markers of the roadway and surrounding vehicles. The method includes grouping the roadway elements into two or more groups according to characteristics of roadway elements indicating common curvatures. The method includes analyzing the two or more groups according to a confidence heuristic to determine a priority group from the two or more groups that corresponds with a trajectory of the ego vehicle. The method includes providing an identifier for the priority group to facilitate at least path planning for the ego vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
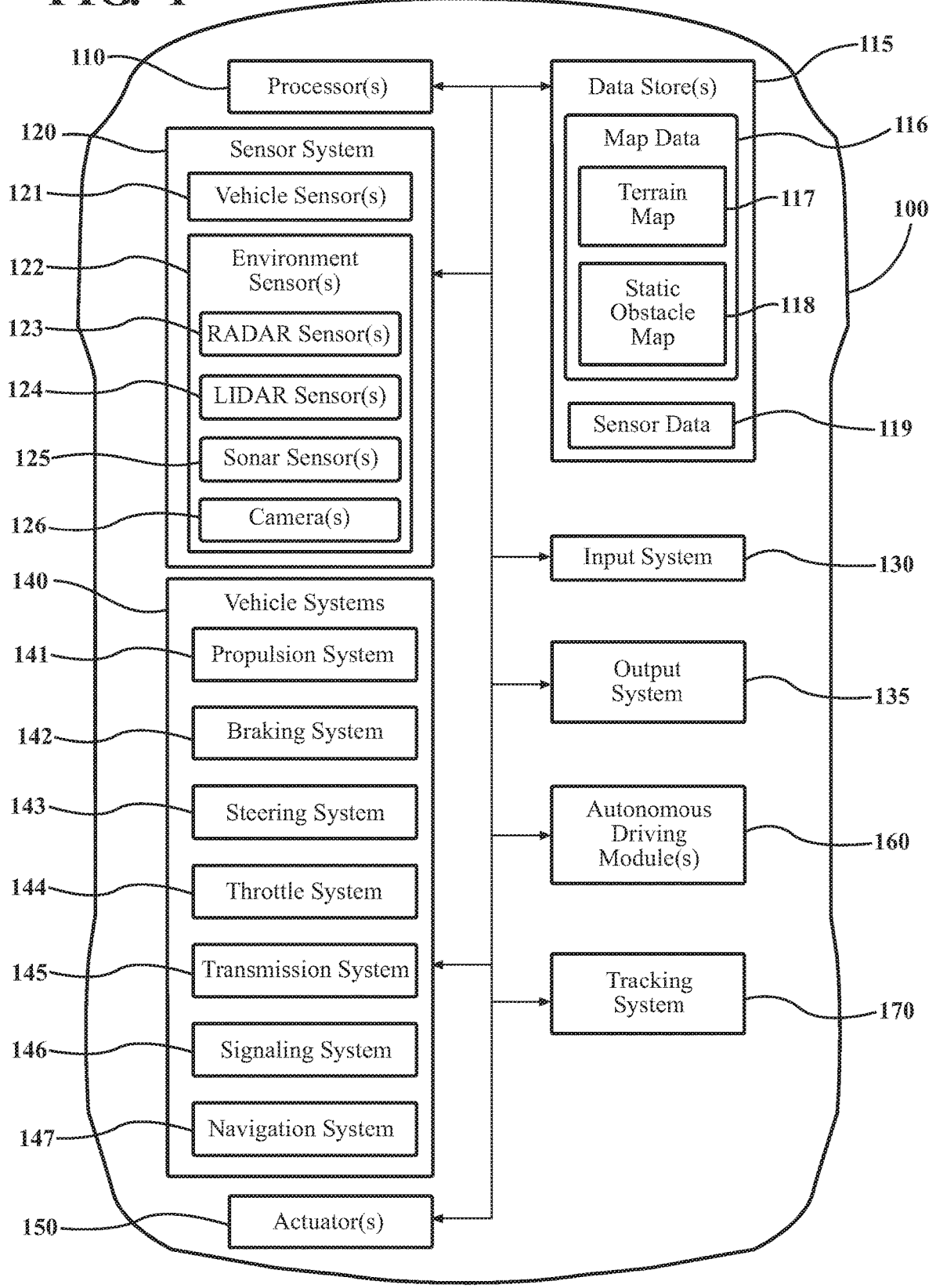
FIG. 1 illustrates one embodiment of a vehicle within which systems and methods disclosed herein may be implemented.

Systems, methods, and other embodiments associated with a manner of improving path selection for a vehicle by identifying roadway elements that provide cues for improving the determination of a vehicle path. As previously noted, observations of a roadway may be inadequate for developing sufficient awareness about paths for a vehicle to follow (e.g., lanes). That is, because a lane marker may be worn/missing or because a marker may be occluded by a vehicle ahead, an ego vehicle may not be able to adequately distinguish a path.

Therefore, in one embodiment, a tracking system uses observations about multiple different aspects of the environment as cues to facilitate identification of a path and improve path planning. In one approach, the tracking system initially acquires sensor data about the surrounding environment from which the system may identify lanes of a roadway, surrounding vehicles, and so on. In general, the tracking system identifies aspects of the surrounding environment that facilitate identifying paths along a roadway. The tracking system then characterizes the separate identified aspects according to, for example, curvature and/or other characteristics. For example, a surrounding vehicle having a trajectory that curves away from the ego vehicle is likely not following a lane that continues along a road but is instead likely following an exit lane. Similarly, a lane maker that curves away or has a general trajectory away from the roadway also is likely associated with an exit lane as opposed to a longitudinal travel lane of the roadway.

Accordingly, the tracking system uses the characteristics to group the different roadway elements using, for example, clustering. In one approach, the tracking system implements a clustering algorithm (E.g., K-medoids, K-means, etc.) that functions to analyze the roadway elements according to the characteristics and define separate groups accordingly. The separate groups define roadway elements having similar characteristics that are likely associated with a similar direction of travel. The tracking system can then analyze the separate groups using, in one or more arrangements, a table of weights that associate separate roadway elements with confidence/trust values indicating to what extent the roadway elements indicate a path that may correspond to a desired path of the ego vehicle. The table may define, for example, weights for separate sets of lane markers, weights for different types of lane markers, weights for vehicles in a same lane as the ego vehicle, weights for vehicles in different lanes, and so on. In any case, the tracking system uses the table of weights according to a confidence heuristic to determine separate confidence values for the roadway elements and calculate priority metrics for the separate groups.

The priority metrics are, in at least one approach, the combined confidence values for a group of roadway elements that characterize each group and an overall correspondence with a path or heading along the roadway. Thus, the tracking system can, for example, compare the priority metrics for the separate groups to determine which group has a desired priority. That is, the tracking system determines which group has a general character that corresponds with a trajectory of the ego vehicle 100. In any case, the tracking system can then use the identified group as part of a path planning routine to provide cues about a path that the ego vehicle should follow. In a further aspect, the tracking system may use the identified group and/or other identified aspects (e.g., lane markers) as a point of comparison against a lane map to perform change detection. In this way, the tracking system improves the operation of the ego vehicle by using available environmental cues to better inform the ego vehicle about how to proceed through an environment.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any device that, for example, transports passengers and includes the noted sensory devices from which the disclosed determinations may be generated. Moreover, in yet further approaches, the noted systems and methods disclosed herein may be implemented as part of other entities such as electronic devices that are not associated with a particular form of transport but are instead embedded as part of a mobile electronic device that can be, for example, carried by an individual and that may function independently or in concert with additional systems (e.g., sensors) of other devices.

In any case, the vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100, while further components of the system are implemented within a cloud-computing environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a tracking system 170 that is implemented to perform methods and other functions as disclosed herein relating to improving awareness of an entity about zones of a transportation network.

As will be discussed in greater detail subsequently, the tracking system 170, in various embodiments, may be implemented partially within the vehicle 100, or other entity, and may further exchange communications with additional aspects of the system 170 that are remote from the vehicle 100 in support of the disclosed functions. Thus, while FIG. 2 generally illustrates the system 170 as being self-contained, in various embodiments, the tracking system 170 may be implemented within multiple separate devices some of which may be remote from the vehicle 100.

Figure 2:
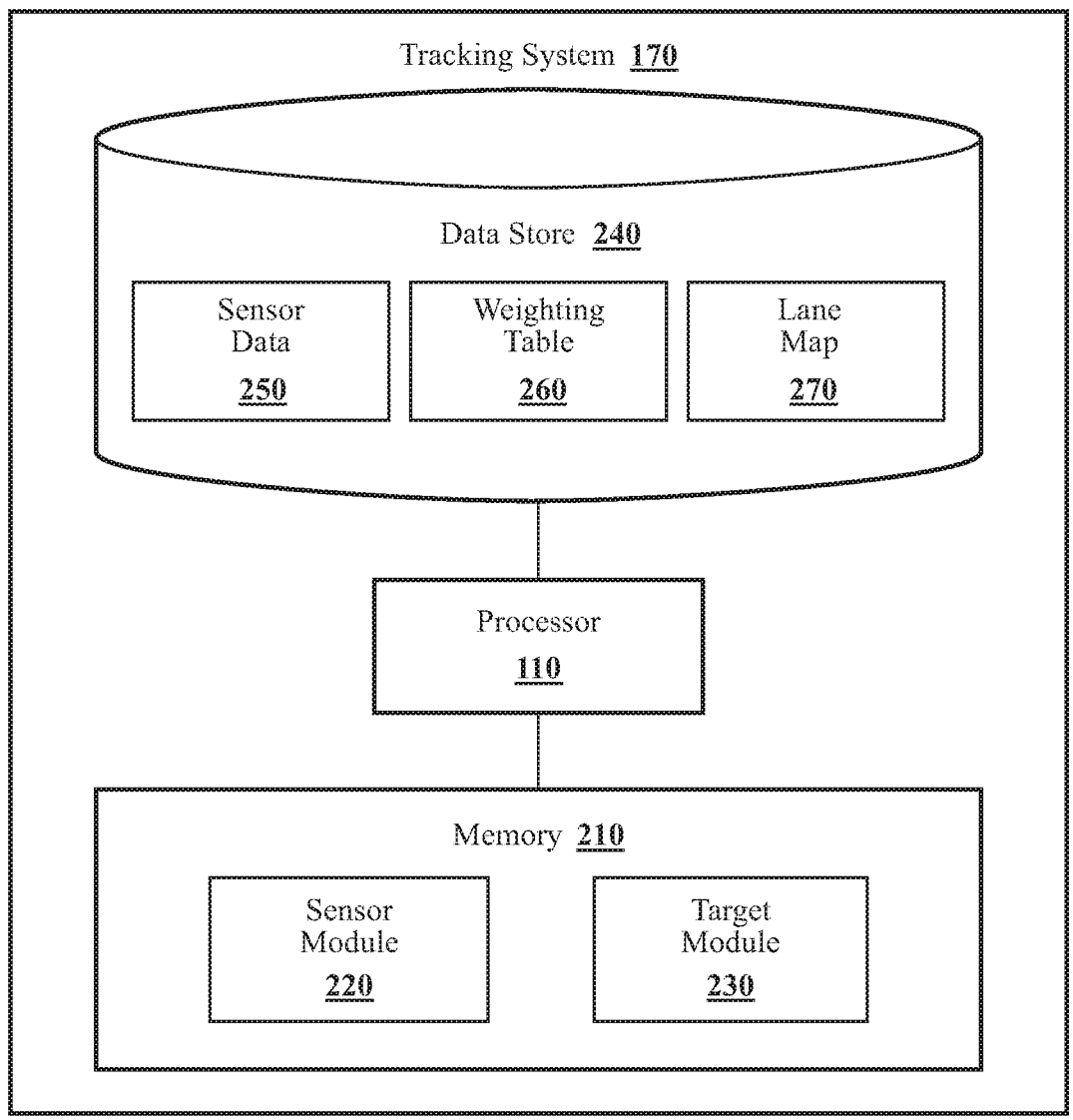
FIG. 2 illustrates one embodiment of a tracking system associated with improving awareness about a surrounding environment through the use of environmental cues.

With reference to FIG. 2, one embodiment of the tracking system 170 of FIG. 1 is further illustrated. The tracking system 170 is shown as including a processor 110 from the vehicle 100 of FIG. 1. Accordingly, the processor 110 may be a part of the tracking system 170, the tracking system 170 may include a separate processor from the processor 110 of the vehicle 100 or the tracking system 170 may access the processor 110 through a data bus or another communication path. In further aspects, the processor 110 is a cloud-based resource that communicates with the tracking system 170 through a communication network. In one embodiment, the tracking system 170 includes a memory 210 that stores a sensor module 220 and a target module 230. The memory 210 is a random-access memory (RAM), read-only memory (ROM), a hard-disk drive, a flash memory, or other suitable memory (either volatile or non-volatile) for storing the modules 220 and 230 and/or other information used by the tracking system 170. The modules 220 and 230 are, for example, computer-readable instructions within the physical memory 210 that, when executed by the processor 110, cause the processor 110 to perform the various functions disclosed herein.

Figure 3:
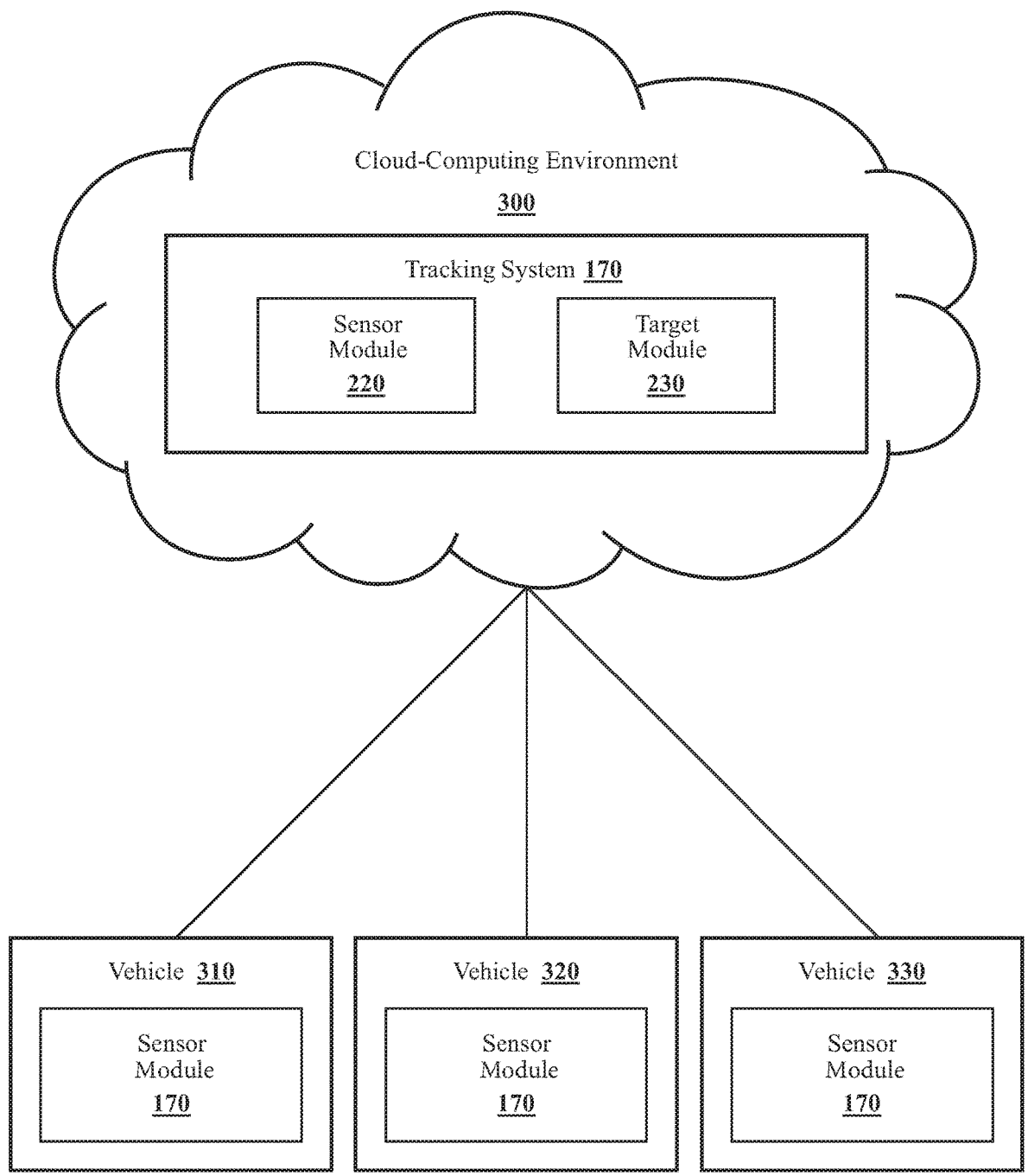
FIG. 3 illustrates a diagram of a tracking system in a cloud-based configuration.

The tracking system 170 may be further implemented as a cloud-based system that functions within a cloud-computing environment 300 as illustrated in relation to FIG. 3. That is, for example, the tracking system 170 may acquire sensor data 250 from various entities, such as vehicles implementing the tracking system 170, and execute as a cloud-based resource that is comprised of devices (e.g., distributed servers) remote from the vehicle 100 to generate determinations about groups and priorities on behalf of the vehicle 100. In one or more approaches, the cloud-computing environment 300 may use observations from multiple different vehicles to generate the determinations for the vehicle 100 and/or assist in path planning for the vehicle 100.

Accordingly, the tracking system 170 within the cloud-computing environment may communicate with various entities (e.g., vehicles 310, 320, and 330) that are geographically distributed or that are co-located within a same geographic area (e.g., traveling on a same roadway). In one approach, the cloud-based tracking system 170 collects the sensor data 250 from components or separate instances of the system 170 that are integrated with the vehicles 310-330. The entities that implement the tracking system 170 within the cloud-computing environment 300 may vary beyond transportation-related devices and encompass road-side units (e.g., statically mounted cameras, LiDARs, and/or other sensor-based systems), mobile devices (e.g., smartphones), and so on. Thus, the set of remote entities that function in coordination with the cloud-based environment 300 may be varied.

Of course, the entities such as the vehicles 310-330 may communicate with the cloud-computing environment 300 using various forms of communications to provide the sensor data 250 and/or to acquire determinations generated by the cloud-computing environment. As such, the cloud-based aspects of the tracking system 170 may process the sensor data 250 for the vehicles 310-330 to generate the determinations about the group priorities. Of course, in further aspects, the entity-based components of the system 170 may perform part of the processing while the cloud-computing environment 300 may handle a remaining portion or function to validate the results of the entity-based instances of the tracking system 170 (i.e., within vehicles 310-330). It should be appreciated that the apportionment of the processing between the remote entities and the cloud-computing environment 300 may vary according to different implementations. Additionally, it should be appreciated that while three separate entities are illustrated along with FIG. 3, the cloud-computing environment 300 generally communicates with a varying number of entities that may be distributed over a wide geographic area.

Continuing with FIG. 2 and a general embodiment of the tracking system 170, in one embodiment, the sensor module 220 includes instructions that function to control the processor 110 to acquire sensor data 250 in order to generate an observation about the surrounding environment. Broadly, an observation, as acquired by the tracking system 170, is information about a particular roadway segment and objects present on the roadway segment as perceived by at least one sensor. Thus, the observation, which may also be broadly referred to as information about a roadway segment, is generally a group of one or more data that are processed into a meaningful form.

The sensor module 220 may acquire various electronic inputs that originate from the vehicle 100, which may be stored in a data store 240 of the tracking system 170 as the sensor data 250. Accordingly, in one embodiment, the tracking system 170 includes the data store 240. The data store 240 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, weighting table 260, a lane map 270, and/or other information that is used by the modules 220 and 230.

Accordingly, the sensor module 220, in one embodiment, controls respective sensors of the vehicle 100 to provide the data inputs in the form of sensor data 250. The sensor module 220 may further process the sensor data 250 into separate observations of the surrounding environment. For example, the sensor module 220, in one approach, fuses data from separate sensors to provide an observation about a particular aspect of the surrounding environment. By way of example, the sensor data 250 itself, in one or more approaches, may take the form of separate images, radar returns, LiDAR returns, and so on. The sensor module 220 may derive determinations (e.g., location, trajectory, etc.) from the sensor data 250 and fuse the data for separate identified aspects of the surrounding environment, such as lane markers, surrounding vehicles, and so on. The sensor module 220 may further extrapolate the sensor data 250 into an observation by, for example, correlating the separate instances of sensor data into a meaningful observation about the object beyond an instantaneous data point. For example, the sensor module 220 may track a surrounding vehicle over many data points to provide a trajectory or may characterize a lane marker over a defined distance. As a further example, the sensor module 220 may derive locations of roadway elements, conditions of the features as the vehicle 100 encounters the features, and so on.

It should be appreciated that, as used herein, the term roadway elements generally includes lane markers, surrounding vehicles, and other aspects of the roadway that may indicate lanes/paths (e.g., curbs, shoulders, etc.). Moreover, the lane markers are, in a broad context, any makers on or embedded within a surface of a roadway that indicate separations between separate lanes or boundaries of the roadway. The lane markers may include solid lines/curves, dashed lines/curves, double solid lines/curves, double dashed lines/curves, and so on. Furthermore, the lane markers may include reflectors and other aspects. Reference to surrounding vehicles, as used herein, generally indicates other vehicles (i.e., forms of transportation, such as busses, trucks, motorcycles, bicycles, etc.) that travel on roadways.

Additionally, while the sensor module 220 is discussed as controlling the various sensors to provide the sensor data 250, in one or more embodiments, the module 220 can employ other techniques that are either active or passive to acquire the sensor data 250. For example, the sensor module 220 may passively sniff the sensor data 250 from a stream of electronic information provided by the various sensors to further components within the vehicle 100. Moreover, as noted, the sensor module 220 can undertake various approaches to fuse data from multiple sensors when providing the sensor data 250. Thus, the sensor data 250, in one embodiment, represents a combination of perceptions acquired from multiple sensors.

Of course, depending on the sensors that the vehicle 100 or other entity includes, the available sensor data 250 that the tracking system 170 can harvest may vary. As one example, according to a particular implementation, the vehicle 100 may include different types of cameras or placements of multiple cameras. As such, the sensor module 220 may, in one or more approaches, be configured to adapt to different electronic inputs depending on the availability of such information. In any case, the sensor module 220 acquires the sensor data and generates the sensor data 250 therefrom. In various approaches, the sensor module 220 may then communicate the sensor data 250 to the cloud-computing environment 300 or locally process the sensor data 250 into knowledge about associated roadway segments described therein.

Continuing with elements of the data store 240, the weighting table 260 includes weights for different roadway elements. The weighting table 260 may distinguish between the different roadway elements according to an extent to which the particular roadway elements may be trusted as indicating a path that corresponds with the vehicle 100. Additionally, the weighting table 260 distinguishes between different combinations of the roadway elements, such as groups of lane markers, surrounding vehicles in varying lanes relative to the ego vehicle 100, and so on. The weighting table 260 will be discussed in further detail subsequently, yet it should be appreciated that the weighting table 260 is implemented to provide a general guide about an extent to which various roadway elements can be trusted as environmental cues for a path along a roadway.

Furthermore, the data store 240 may also include the lane map 270. The lane map 270 may be part of map data 116, as shown in FIG. 1, or may be a separate element specific to the tracking system 170. In either case, the lane map 270, in one or more embodiments, specifies locations and configurations of lane markers along a roadway. Thus, as discussed further subsequently, the tracking system 170 may use the lane map 270 to further verify identified lane markers and function as an additional source of information about the roadway when determining a path for the vehicle 100 beyond simply leveraging the sensor data 250.

Returning to the sensor module 220, in one or more arrangements, the sensor module 220 analyzes the sensor data 250 about the roadway elements, in one or more embodiments, to identify characteristics about the roadway elements. The characteristics function to identify traits or identifying aspects of the roadway elements that the tracking module 230 may then use to group the roadway elements. In one arrangement, the characteristics include curvature of a trajectory or form (i.e., for lane markers) of the roadway element. In further aspects, the characteristics include curvature, curvature derivative, lane offset, and yaw/heading. As noted, the characteristics of the roadway parameters identify traits of the roadway elements in relation to, for example, whether the specific roadway elements define a path or paths along a roadway on which the vehicle 100 is traveling or along an exit lane or other roadway that is diverging from the roadway. Thus, the tracking system 170 can then use the roadway elements and the characteristics of those elements to derive environmental cues that provide inferences about a path along the roadway and which aspects can be trusted as identifying the path.

Continuing with FIG. 2, in one embodiment, the target module 230 includes instructions that, when executed by the one or more processors 110, cause the one or more processors 110 to determine groups for the roadway elements and which group is indicative of a path for the vehicle 100 to follow. In one or more approaches, the target module 230 groups the roadway elements using a clustering algorithm. For example, the target module 230 uses the clustering algorithm to identify similarities/dissimilarities between the roadway elements and to group the roadway elements accordingly. In one embodiment, the target module 230 implements a k-medoids clustering algorithm to group the roadway elements according to the characteristics. In further embodiments, the target module 230 implements a k-means clustering algorithm or another clustering algorithm that determines, in general, which roadway elements are parallel (e.g., the roadway elements having the same or similar curvatures), and groups the roadway elements accordingly. Therefore, the target module 230 produces two or more groups of roadway elements that are separately parallel.

The target module 230 can then analyze the groups to determine a priority group. The priority group is one of the groups that corresponds with roadway elements that are parallel with the trajectory of the vehicle 100 along the roadway. Thus, the groups that the target module 230 does not select as the priority groups generally exhibit a character that not parallel with an intended path of the ego vehicle 100. To determine which of the groups satisfy these criteria, the target module 230, in one or more approaches, analyzes the groups using the weighting table 260 according to a confidence heuristic. The confidence heuristic generally defines how the weighting table is applied to the roadway elements. For example, the confidence heuristic may indicate which roadway elements are separate distinct features and how to combine values from the weighting table 260 to determine confidence values for the separate roadway elements (e.g., weights) and overall priority metrics for the groups. In at least one arrangement, the priority metric of a group represents the combined weights/confidence values for the separate roadway elements of the group. Thus, the target module 230 generates the confidence values for the separate groups according to the weighting table 260 and the confidence heuristic.

Once the target module 230 groups the roadway elements and determines the confidence values for the separate groups, the target module 230 proceeds to, for example, further analyze the groups by comparing the confidence values to determine a priority group. In one embodiment, the priority group is a group that most closely corresponds to a parallel direction with the ego vehicle 100. Thus, the target module 230 determines the priority group, in one approach, by comparing the confidence values and determining which group has highest absolute value. Of course, while the highest value is discussed, in other arrangements, the target module 230 may determine the priority group according to another metric, such as a lowest value, or another suitable indicator.

Accordingly, the priority group represents a set of roadway elements that provide cues or inferences to the vehicle 100 about a path that the vehicle 100 is to follow. As such, the target module 230, in one embodiment, provides the roadway elements from the priority group or at least indicators thereof to the autonomous driving module 160 or another system in the vehicle 100 to facilitate path planning. For example, the target module 230 may fuse the information about the roadway elements from the priority group to provide cues to a path planning process about a path that the vehicle 100 should follow. This provides an inference about how the vehicle 100 should proceed along the roadway in order to improve the confidence of the path planning. In a further aspect, the tracking system 170 may further use the identified information about the roadway elements as a point of comparison against the lane map 270 to identify changes to the roadway and to update a map. In this way, the system 170 identifies inaccuracies in the lane map 270 to improve and avoids following inaccurate information while also improving path planning by using the observed environmental cues.

Figure 4:
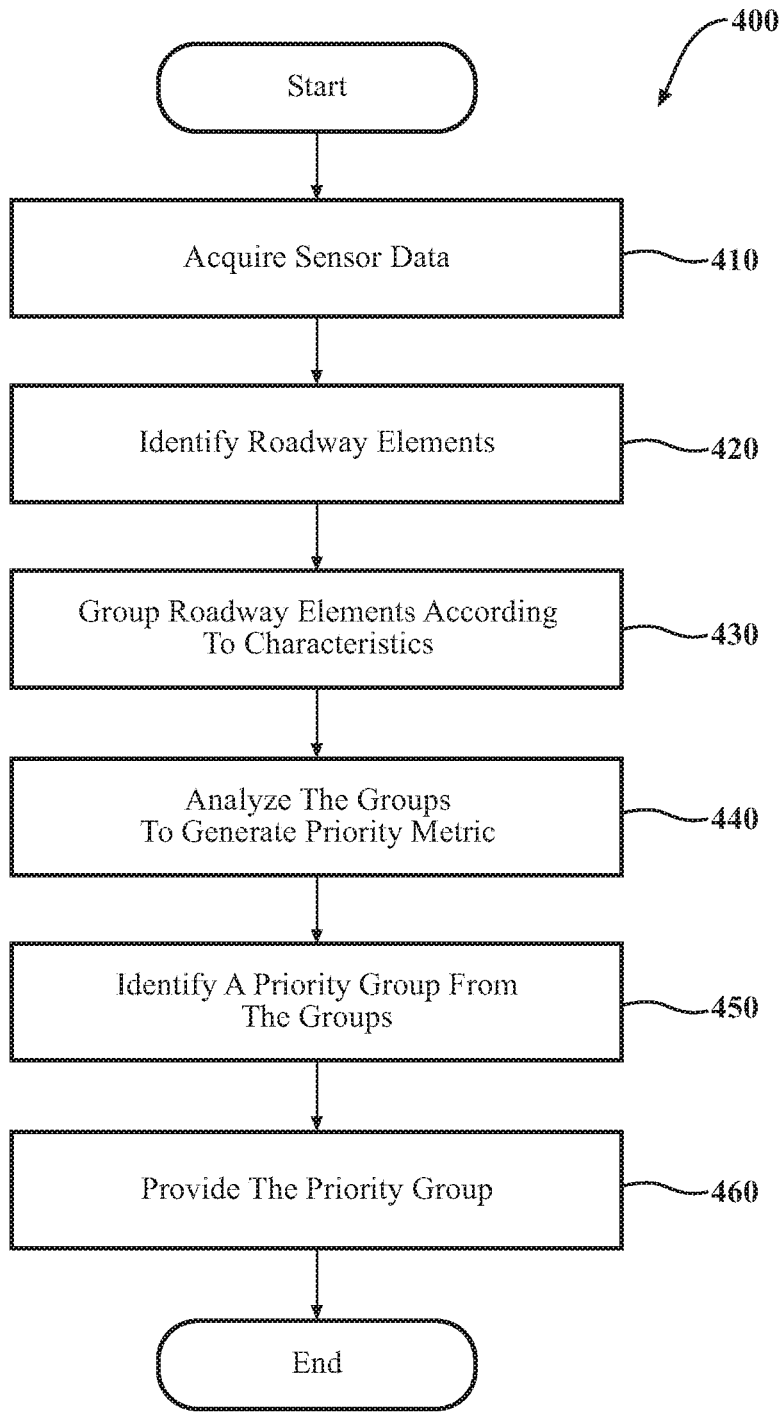
FIG. 4 is a flowchart illustrating one embodiment of a method associated with identifying roadway elements to use as environmental cues and determining priorities of groups of the roadway elements.

FIG. 4 illustrates a flowchart of a method 400 that is associated with improving identification of a path for an ego vehicle on a roadway. Method 400 will be discussed from the perspective of the tracking system 170 of FIGS. 1-2. While method 400 is discussed in combination with the tracking system 170, it should be appreciated that the method 400 is not limited to being implemented within the tracking system 170 but is instead one example of a system that may implement the method 400. Furthermore, while the method is illustrated as a generally serial process, various aspects of the method 400 can execute in parallel to perform the noted functions. Additionally, one or more of the illustrated blocks may be executed by a cloud-based computing system in cooperation with an instance of the tracking system 170 on a vehicle or other device.

At 410, the sensor module 220 acquires the sensor data 250 about a present location on a roadway. In one embodiment, the tracking system 170 controls the sensor system 120 to acquire the sensor data 250 from various sensors within the vehicle 100, including environment sensors 122. For example, in at least one approach, the tracking system 170 acquires the sensor data 250 about a surrounding environment of the vehicle 100. Thus, the sensor module 220 acquires information about the particular location and aspects present in the surrounding environment. As previously noted, the various aspects generally include lane markers or other indicators of lanes and surrounding vehicles or other objects that follow lanes along the roadway.

Moreover, the tracking system 170 controls the sensors to acquire the sensor data at successive iterations or time steps. Thus, the tracking system 170, in one embodiment, iteratively executes the functions discussed at blocks 410-460 to acquire the sensor data 250 and provide information therefrom. Furthermore, the tracking system 170, in one embodiment, executes one or more of the noted functions in parallel for separate observations. In one aspect, the tracking system 170 may be generating observations/information according to current sensor data while providing prior observations in parallel. Thus, in one approach, the tracking system 170 may execute multiple iterations of the method 400 in parallel.

At 420, the sensor module 220 identifies the roadway elements from the sensor data 250 as cues about the path. The sensor module 220, in one approach, distinguishes the roadway elements from other perceived aspects of the environment, such as trees, buildings, etc., to isolate aspects that are relevant to the determination of environmental cues for path identification. The sensor module 220 may implement various algorithms to perform instance segmentation and classification in order to derive the roadway elements from the sensor data 250. For example, the algorithms may include convolutional neural networks or other forms of deep learning. In any case, the sensor module 220 identifies the roadway elements from the sensor data 250, and may, as part of identifying the roadway elements, compute characteristics about the roadway elements. The characteristics include, in one or more arrangements, curvatures of the lane markers and trajectories of the surrounding vehicles, curvature derivatives of the curvatures, lane offsets, and headings of the lane markers and trajectories of the surrounding vehicles. Of course, in further aspects, the tracking system 170 may implement a different combination of characteristics, including aspects not explicitly defined herein that facilitate characterizing whether the roadway elements indicate similar paths.

At 430, the target module 230 groups the roadway elements into two or more groups according to the characteristics of the roadway elements that indicate commonalities therebetween (e.g., curvature). In one embodiment, the target module 230 groups the roadway elements using clustering. Clustering the groups may include applying a clustering algorithm according to the characteristics. The clustering algorithm identifies similarities between the roadway elements and clusters or groups the roadway elements together according to an extent of the similarities. In this way, the tracking system 170 can distinguish between which of the roadway elements are associated with common curvatures along the roadway.

At 440, the target module 230 analyzes the two or more groups according to a confidence heuristic to determine a priority group. In one embodiment, the target module 230 uses the confidence heuristic to apply the weighting table to the roadway elements in the groups. As previously outlined, the confidence heuristic determines separate confidence values for the individual roadway elements from the weighting table 260 and defines how the target module 230 generates the priority metrics for the groups from the confidence values. That is, the target module 230 calculates the priority metrics for the groups using the confidence values that represent an extent to which the system 170 trusts the separate roadway elements as indicating a path along the roadway.

At 450, the target module 230 determines a priority group. In one embodiment, the target module 230 determines which of the two or more groups to select as the priority group according to a comparison of the priority metrics (i.e., the combined confidence values of the roadway elements in each group). In general, the priority group from the previously defined groups has a preferred priority metric that corresponds with a path of the vehicle 100. In one approach, the target module 230 determines the priority group by comparing the priority metrics for the separate groups and identifying which of the priority metrics indicates the associated group is trusted as correlating with the trajectory of the ego vehicle 100. The target module 230 may use an inequality to determine the priority from the comparison (i.e., which has a larger value) or another approach.

At 460, the target module 230 provides the priority group. In one embodiment, the target module 230 provides an identifier for the priority group to facilitate at least path planning for the ego vehicle 100. For example, the target module 230 may cause the autonomous driving module 160 to use the roadway elements of the priority group as an indicator about environmental cues that are parallel to a direction of the path when generating the path (e.g., path planning) for the ego vehicle 100. Since the vehicle 100 may operate autonomously, the tracking system 170 can provide the roadway elements as cues in order to facilitate autonomously following a path along the roadway that is trusted according to the observed aspects. As previously noted, in an additional aspect, the target module 230 may further use the identified roadway elements and the identified characteristics as a point of comparison against the lane map 270 to identify changes. In this way, the tracking system 170 improves path planning for the vehicle 100 and may further improve change detection for aspects of the roadway, such as lane markers.

Figure 5:
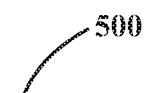
FIG. 5 illustrates one version of a weighting table.

FIG. 5 illustrates one example of a weighting table 500. As shown, the weighting table 500, which is an example of the weighting table 260, includes two separate columns. The columns define the separate roadway elements and confidence values that correspond with the roadway elements. To further explain the roadway elements as presented in the table 500, 4 lines that are parallel refers to lane markers of a roadway, such as may occur on a highway with three or more lanes. Thus, instead of individually considering the lane markers, the weighting table 500 can define broader sets of elements. Similarly, 3 lines that are parallel refers to three separate parallel lane markers along a roadway. 2 ego-lines that are parallel refers to lines of a lane in which the vehicle 100 is traveling. "Ego-lane surrounding vehicle" refers to a surrounding vehicle that is traveling in a same lane as the ego vehicle 100. "Other Surrounding Vehicle" refers to surrounding vehicles in lanes other than the lane of travel for the ego vehicle 100. "Single solid line" refers to a single lane marker (or curb or another indicator). "Single dash line" refers to a single dashed line. Of course, in further embodiments, the weighting table 260 may define additional aspects of the environment as roadway elements beyond what is shown in the example table 500.

Figure 6:
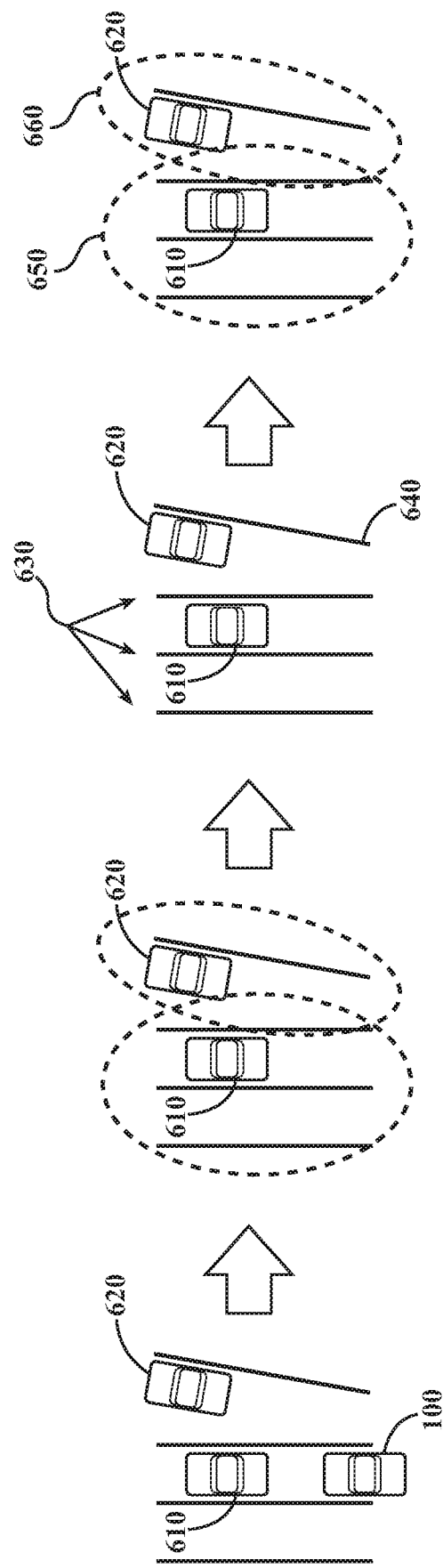
FIG. 6 illustrates an example scenario of an ego vehicle on a roadway.

FIG. 6 illustrates an example of how the tracking system 170 identifies roadway elements, group the elements, and determines a priority group. As shown in FIG. 6, example 600 illustrates two vehicles 610 and 620 traveling ahead of the ego vehicle 100 on a roadway. Thus, the tracking system 170 of the vehicle 100 initially acquires sensor data 250 about the roadway and identifies the vehicles 610 and 620, three parallel lines 630, and a single solid line 640. Accordingly, the target module 230 groups the roadway elements (e.g., vehicle 610 and three parallel lines 630) into group 650 and groups roadway elements 620 and 640 into group 660 according to the characteristics of the elements that indicate similar directionality between the group members.

Subsequently, the target module 230 uses the confidence heuristic to correlate the roadway elements with elements defined in the table 260 and determine the confidence values for each separate element. By way of example, the surrounding vehicle 610 is an ego-lane vehicle and corresponds with a confidence value of 0.4 while the lane markers 630 are three parallel lines that correspond with a confidence value of 1.0. Thus, the priority metric for the group 650 is 1.4. Group 660 includes a single solid line 640 having a confidence value of 0.3, and the vehicle 620 has a value of 0.4 for a priority metric of 0.7. As such, the target module 230 compares the priority metrics of 1.4 and 0.7 and determines that group 650 is the priority group. Accordingly, the target module 230 provides an identifier and/or sensor data 250 about the priority group to the autonomous driving module 160 to cause the module 160 to consider the cues of the associated roadway elements when optimizing a path for the vehicle 100 to autonomously follow.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s)

115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the tracking system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the tracking system 170, and/or the autonomous driving module(s) 160 may control some or all of these vehicle systems 140 and, thus, may be partially or fully autonomous.

The processor(s) 110, the tracking system 170, and/or the autonomous driving module(s) 160 can be operatively connected to communicate with the various vehicle systems 140 and/or individual components thereof. For example, returning to FIG. 1, the processor(s) 110, the tracking system 170, and/or the autonomous driving module(s) 160 can be in communication to send and/or receive information from the various vehicle systems 140 to control the movement, speed, maneuvering, heading, direction, etc. of the vehicle 100. The processor(s) 110, the tracking system 170, and/or the autonomous driving module(s) 160 may control some or all of these vehicle systems 140.

The processor(s) 110, the tracking system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the tracking system 170, and/or the autonomous driving module(s) 160 can control the direction and/or speed of the vehicle 100. The processor(s) 110, the tracking system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the tracking system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A tracking system for improving identification of a path for an ego vehicle on a roadway, comprising:
one or more processors;
a memory communicably coupled to the one or more processors and storing:
a sensor module including instructions that when executed by the one or more processors cause the one or more processors to, in response to acquiring sensor data from at least one sensor of the ego vehicle about a surrounding environment, identify roadway elements from the sensor data as cues about the path, wherein the roadway elements include lane markers of the roadway and trajectories of one or more surrounding vehicles with combinations of individual lane markers as single roadway elements with the lane markers across multiple separate lanes defining a single element; and
a target module including instructions that when executed by the one or more processors cause the one or more processors to group the roadway elements into two or more groups that are separately parallel according to characteristics of the lane markers and the trajectories of the one or more surrounding vehicles indicating parallelism using a clustering algorithm,
wherein the target module includes instructions to analyze the two or more groups according to a confidence heuristic by calculating priority metrics for each of the groups including assigning weights to the roadway elements, including weights for sets of lane lines of multiple lanes, to determine a priority group from the two or more groups that corresponds with a trajectory of the ego vehicle as an indicator of being parallel with a path of the ego vehicle, and
wherein the target module includes instructions to cause the ego vehicle to plan the path using the roadway elements of the priority group as an indicator about environmental cues that are parallel to a direction of the path and controlling the ego vehicle to follow the path.

2. The tracking system of claim 1, wherein the target module includes instructions to group the roadway elements into the two or more groups including instructions to cluster the roadway elements using the clustering algorithm according to the characteristics to generate the two or more groups with select ones of the roadway elements that correspond in relation to at least curvature, wherein separate ones of the groups are not parallel to one another, and
wherein the sensor module includes instructions to identify the roadway elements including instructions to identify the roadway elements for an observation of the surrounding environment embodied by the sensor data that is of a discrete time.

3. The tracking system of claim 1, wherein the weights from a weighting table indicate separate confidence values for the roadway elements, wherein the target module includes instructions to assign weights including instructions to assign different weights to the trajectories according to lanes of the one or more surrounding vehicles relative to the ego vehicle,
wherein the target module includes instructions to compare the priority metrics including instructions to apply an inequality to determine which of the two or more groups to select as the priority group, and
wherein the trajectory of the ego vehicle is a current heading of the ego vehicle.

4. The tracking system of claim 3, wherein the target module includes instructions to analyze the two or more groups to determine a priority group including instructions to determine which of the two or more groups to select as the priority group according to a comparison of the priority metrics for the two or more groups in order to identify which of the two or more groups is trusted as correlating with the trajectory of the ego vehicle.

5. The tracking system of claim 1, wherein the target module includes instructions to identify the roadway elements including instructions to detect the roadway elements by analyzing the sensor data and computing the characteristics of the roadway elements, and wherein the characteristics include one or more of curvatures of the lane markers and trajectories of the surrounding vehicles, curvature derivatives of the curvatures, lane offsets, and headings of the lane markers and trajectories of the surrounding vehicles.

6. The tracking system of claim 1,
wherein the sensor module includes instructions to identify the roadway elements including instructions to identify combinations of individual lane markers as single roadway elements, including when portions of the surrounding environment are occluded.

7. The tracking system of claim 1, wherein the target module includes instructions to provide an identifier for the priority group including instructions to provide an indicator about whether the lane markers correspond with a lane map of prior mappings of the surrounding environment.

8. The tracking system of claim 1, wherein the ego vehicle is an autonomous vehicle, and wherein a weighting table assigns weights to different ones of the roadway elements according to a type including multiple parallel lane markers, lane markers of an ego lane of the ego vehicle, single lane markers, single dashed lane markers, and surrounding vehicles.

9. A non-transitory computer-readable medium storing instructions for improving identification of a path for an ego vehicle on a roadway and that when executed by one or more processors cause the one or more processors to:
in response to acquiring sensor data from at least one sensor of the ego vehicle about a surrounding environment, identify roadway elements from the sensor data as cues about the path, wherein the roadway elements include lane markers of the roadway and trajectories of one or more surrounding vehicles with combinations of individual lane markers as single roadway elements with the lane markers across multiple separate lanes defining a single element;
group the roadway elements into two or more groups that are separately parallel according to characteristics of the lane markers and the trajectories of the one or more surrounding vehicles indicating parallelism using a clustering algorithm,
analyze the two or more groups according to a confidence heuristic by calculating priority metrics for each of the groups including assigning weights to the roadway elements, including weights for sets of lane lines of multiple lanes, to determine a priority group from the two or more groups that corresponds with a trajectory of the ego vehicle as an indicator of being parallel with a path of the ego vehicle; and
provide the priority group to cause the ego vehicle to plan the path using the roadway elements of the priority group as an indicator about environmental cues that are parallel to a direction of the path and controlling the ego vehicle to follow the path.

10. The non-transitory computer-readable medium of claim 9, wherein the instructions to group the roadway elements into the two or more groups include instructions to cluster the roadway elements using a clustering algorithm according to the characteristics to generate the two or more groups with select ones of the roadway elements that correspond in relation to at least curvature, and
wherein the instructions to identify the roadway elements include instructions to identify the roadway elements for an observation of the surrounding environment embodied by the sensor data that is of a discrete time.

11. The non-transitory computer-readable medium of claim 9, wherein the weights from a weighting table indicate separate confidence values for the roadway elements, wherein the instructions to assign the weights include instructions to assign different weights to the trajectories according to lanes of the one or more surrounding vehicles relative to the ego vehicle,
wherein the instructions to compare the priority metrics include instructions to apply an inequality to determine which of the two or more groups to select as the priority group, and
wherein the trajectory of the ego vehicle is a current heading of the ego vehicle.

12. The non-transitory computer-readable medium of claim 11, wherein the instructions to analyze the two or more groups to determine a priority group include instructions to determine which of the two or more groups to select as the priority group according to a comparison of the priority metrics for the two or more groups in order to identify which of the two or more groups is trusted as correlating with the trajectory of the ego vehicle.

13. The non-transitory computer-readable medium of claim 9, wherein the instructions to identify the roadway elements include instructions to detect the roadway elements by analyzing the sensor data and computing the characteristics of the roadway elements, and wherein the characteristics include one or more of curvatures of the lane markers and trajectories of the surrounding vehicles, curvature derivatives of the curvatures, lane offsets, and headings of the lane markers and trajectories of the surrounding vehicles.

14. A method, comprising:
in response to acquiring sensor data from a sensor of an ego vehicle about a surrounding environment including a roadway, identifying roadway elements from the sensor data, the roadway elements including lane markers of the roadway and trajectories of one or more surrounding vehicles with combinations of individual lane markers as single roadway elements with the lane markers across multiple separate lanes defining a single element;
grouping the roadway elements into groups according to characteristics of the lane markers and the trajectories of the one or more surrounding vehicles indicating parallelism using a clustering algorithm;
analyzing the groups according to a confidence heuristic by calculating priority metrics for each of the groups including assigning weights to the roadway elements to determine a priority group from the groups that corresponds with a trajectory of the ego vehicle; and
providing the priority group to cause the ego vehicle to plan a path using the roadway elements of the priority group as an indicator about environmental cues that are parallel to a direction of the path and controlling the ego vehicle to follow the path.

15. The method of claim 14, wherein grouping the roadway elements into the groups includes clustering the roadway elements using a clustering algorithm according to the characteristics to generate the groups with select ones of the roadway elements that correspond in relation to at least curvature, and wherein identifying the roadway elements includes identifying the roadway elements for an observation of the surrounding environment embodied by the sensor data that is of a discrete time.

16. The method of claim 14, wherein the weights from a weighting table indicate separate confidence values for the roadway elements, wherein assigning the weights includes assigning different weights to the trajectories according to lanes of the one or more surrounding vehicles relative to the ego vehicle, wherein comparing the priority metrics includes applying an inequality to determine which of the groups to select as the priority group, and wherein the trajectory of the ego vehicle is a current heading of the ego vehicle.

17. The method of claim 16, wherein analyzing the groups to determine a priority group includes determining which of the groups to select as the priority group according to a comparison of the priority metrics for the groups in order to identify which of the groups is trusted as correlating with the trajectory of the ego vehicle.

18. The method of claim 14, wherein identifying the roadway elements includes detecting the roadway elements by analyzing the sensor data and computing the characteristics of the roadway elements, and wherein the characteristics include one or more of curvatures of the lane markers and trajectories of the surrounding vehicles, curvature derivatives of the curvatures, lane offsets, and headings of the lane markers and trajectories of the surrounding vehicles.

19. The method of claim 14, wherein identifying the roadway elements includes identifying combinations of individual lane markers as single roadway elements, including when portions of the surrounding environment are occluded.

20. The method of claim 14, wherein providing an identifier for the priority group includes providing an indicator about whether the lane markers correspond with a lane map of prior mappings of the surrounding environment.

* * * * *